M. J. TRUMBLE.
VAPORIZING DEVICE FOR INTERNAL COMBUSTION ENGINES.
APPLICATION FILED JULY 22, 1918.

1,359,292.

Patented Nov. 16, 1920.
2 SHEETS—SHEET 1.

Inventor
Milton J. Trumble
by Graham & Harris
Attorneys

M. J. TRUMBLE.
VAPORIZING DEVICE FOR INTERNAL COMBUSTION ENGINES.
APPLICATION FILED JULY 22, 1918.
1,359,292.
Patented Nov. 16, 1920.
2 SHEETS—SHEET 2.
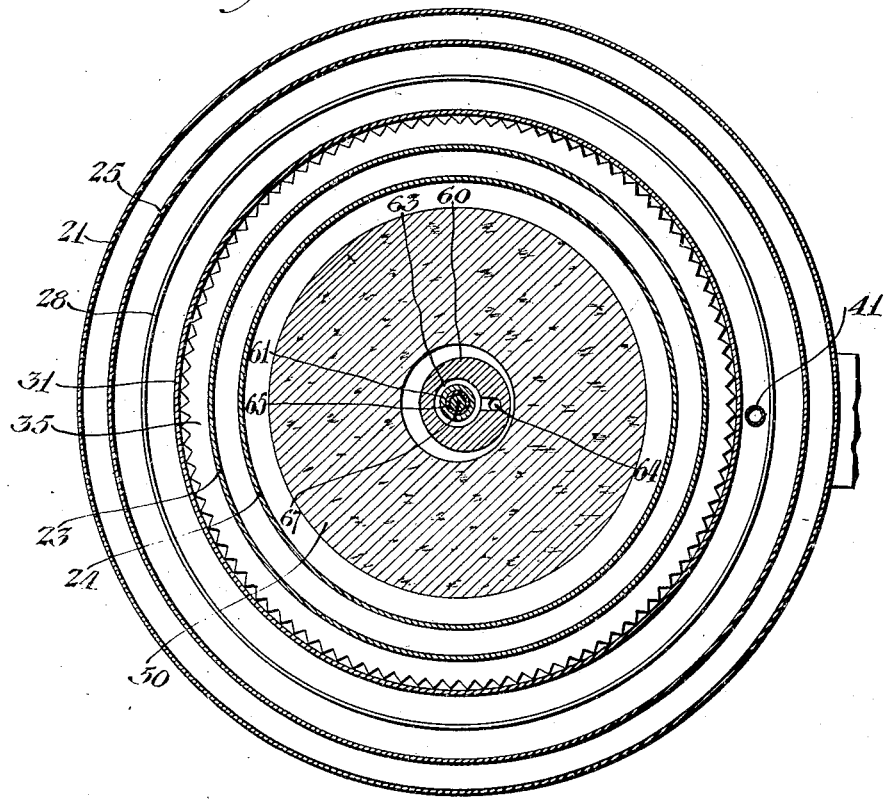
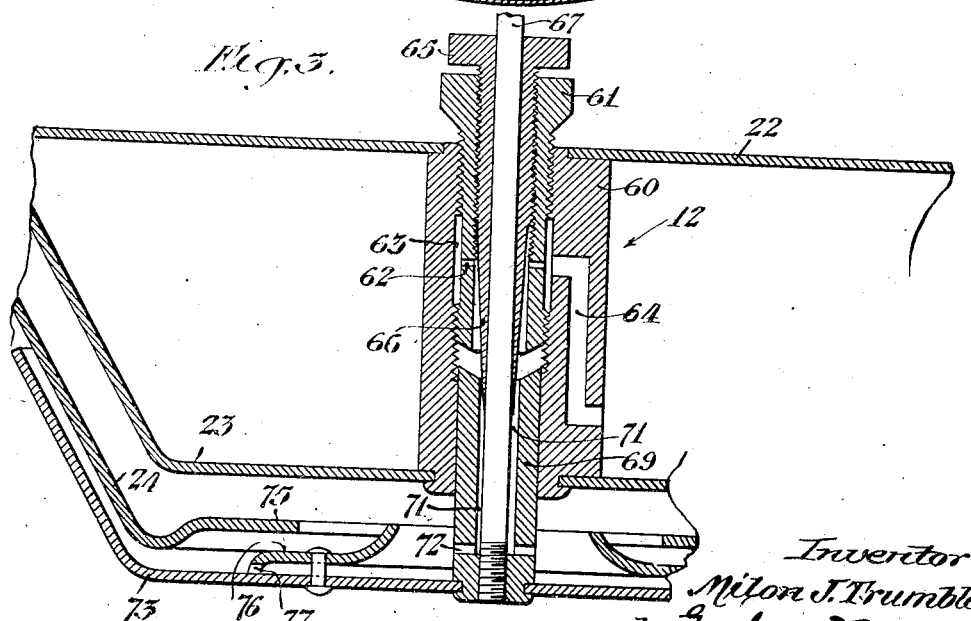
Inventor
Milton J. Trumble
by Graham Harris
Attorneys

UNITED STATES PATENT OFFICE.

MILON J. TRUMBLE, OF ALHAMBRA, CALIFORNIA.

VAPORIZING DEVICE FOR INTERNAL-COMBUSTION ENGINES.

1,359,292.   Specification of Letters Patent.   Patented Nov. 16, 1920.

Application filed July 22, 1918. Serial No. 246,407.

*To all whom it may concern:*

Be it known that I, MILON J. TRUMBLE, a citizen of the United States, residing at Alhambra, in the county of Los Angeles and State of California, have invented a new and useful Improvement in Vaporizing Devices for Internal-Combustion Engines, of which the following is a specification.

My invention relates to internal combustion engines, and more particularly to devices for preparing the explosive mixture used in such engines.

The principal object of my invention is to provide a device which will utilize a lower grade of fuel, mixing this fuel with air in the proper proportions automatically to suit the varying needs of the engine.

A further object of the invention is to provide means for separating from the mixture any partially vaporized particles or drops, and it is a further object of the invention to provide means for heating the mixture previous to such separation so as to put it in condition for use in the engine.

In the drawings, which are for illustrative purposes only,

Fig. 2 is a section on the line 2—2 of Fig. 1, viewed in the direction of the arrows.

Fig. 3 is an enlarged view of a portion of the apparatus shown in Fig. 1 with the parts in their operative condition.

Figure 1:
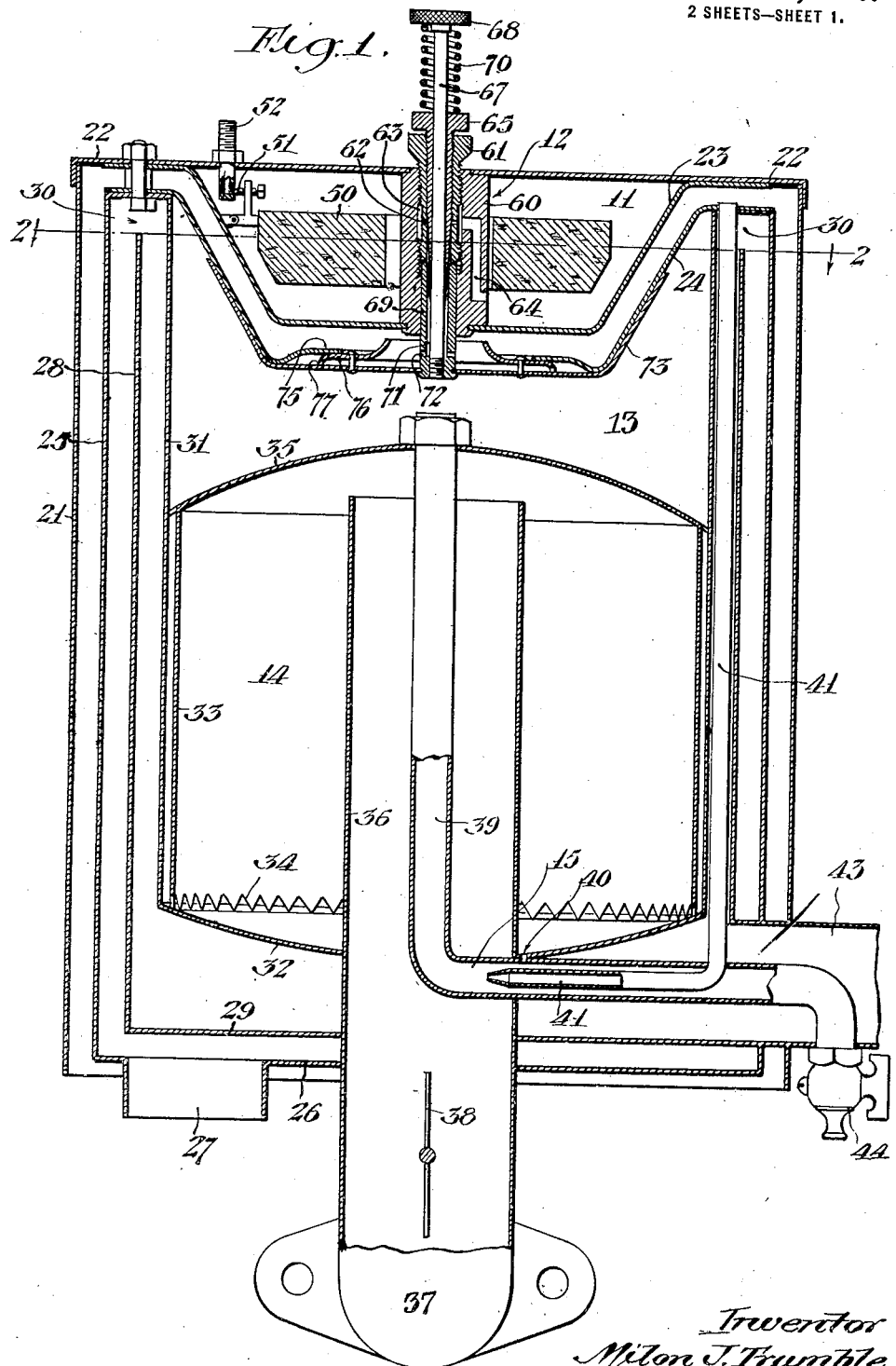
Figure 1 is a sectional elevation of the apparatus embodying my invention.

In the embodiment of my invention shown I have provided a vaporizing device which is adapted to operate on kerosene, distillate, or other low grade petroleum products. Broadly considered, the apparatus consists of walls inclosing a storage reservoir 11, a vaporizing apparatus 12, a mixing chamber 13, a vapor separating chamber 14 and reinjection means 15.

In the embodiment shown an outer cylindrical shell 21 is provided with a tight top 22 to which is secured an upper pan 23. A lower pan 24 is placed in spaced relationship to the upper pan 23, and a cylindrical shell 25 is secured thereto, the shell 25 having a tight bottom 26 with an exhaust opening 27 therein. Located inside the members 25 and 21 is a cylindrical shell 28 having a tight bottom 29, this shell 28 being spaced away from the bottom of the pan 24 to leave an opening 30. Located inside the shell 28 is a shell 31 which is secured in gas tight relationship to the pan 24, this shell having a domed bottom 32. Resting on the bottom 32 is a shell 33 having serrated edges 34, the shell 33 having a domed top 35. An outlet pipe 36 extends from a point just under the domed top 35 through the members 32, 29 and 26 in air tight relationship therewith, being connected to the intake manifold 37 of the engine, a throttle valve 38 being placed therein. A reinjection pipe 39 is secured in the domed top 35, passing therethrough and being in open communication with the vaporizing chamber 13. A drain opening 40 connects the interior of the pipe 39 with the vapor separating chamber 14 which is inside the shell 33. A reinjection pipe 41 is placed in the pipe 39, this reinjection pipe 41 extending up and opening into the space between the pans 23 and 24. The pipe 39 extends downwardly through the walls of an exhaust intake 43, being provided with a pet cock 44. The exhaust intake 43 extends through the shells 21 and 25 in air tight relationship therewith and connects into the shell 28 below the bottom 32 and above the bottom 29.

Located in the storage reservoir 11 is a float 50 controlling a needle valve 51 in a distillate supply pipe 52 in accordance with the standard carbureter practice.

The vaporizing means 12 consists of a body 60 which is secured in air tight relationship to the top 22 and to the upper pan 23. The body 60 has a central opening in which is threaded a bushing 61, this bushing having a plurality of ports 62 communicating with an annular space 63 which is connected through an intake port 64 with the storage reservoir 11. Threaded in the bushing 61 is an adjusting nipple 65, this nipple having a conical portion 66. Sliding freely in the nipple 65 is a stem 67, which is provided with a cap 68 and which is surrounded by a compression spring 70, this compression spring pressing against the top of the nipple 65 and against the cap 68, tending to force the cap upwardly and thus forcing the stem 67 and the parts connected thereto upwardly. Rigidly connected to the stem 67 is a valve 69, this valve sliding in fairly tight relationship in the central opening in the body 60 and having a central opening 71 somewhat larger than the stem 67 so that the valve 69 can slide over and make a tight closure with the conical portion of the nipple 65. The opening 71 communicates at its lower end with a plurality of spray ports 72.

The valve 69 is rigidly secured in a suction pan 73, this suction pan having the same configuration as the lower pan 24, and fitting tightly thereover when the stem 67 is in its extreme upper position. The lower pan 24 has a flexible lip 75 which, when the parts are in their upper position, rests against a seat plate 76 secured to the suction pan 73. This seat plate 76 is provided with a plurality of openings 77.

The method of operation is as follows: With the parts in the position shown in Fig. 1 the engine is started in the usual manner creating a partial vacuum through the intake manifold and through the outlet pipe 36 in the vapor separating chamber 14. The unbalanced atmospheric pressure caused by this vacuum forces air through the space between the shells 31 and 33 and causes a partial vacuum in the vaporizing chamber 13, which acts to pull the suction pan 73 downwardly and air is admitted to the space between the pans 23 and 24, this air passing upwardly through the preheating chamber formed between the shells 21 and 25 where it is heated by the exhaust as will hereinafter be made evident.

As the suction pan 73 moves downwardly it first separates from the pan 24, the lip 75 still being in contact with the seat plate 76. The air from between the pans passes under the seat plate 76 and through the openings 77, this air passing outwardly between the pans 24 and 73 into the vaporizing chamber 13. As the valve 69 is moved downwardly with the suction pan 73, the upper portion of this valve is moved away from the conical end of the nipple 65, and the partial vacuum caused by the engine exhaust pulls the fuel downwardly around the stem 67 and outwardly through the ports 72, this liquid fuel passing through the ports 64 and the ports 62. The liquid fuel is mixed with the air which passes under the seat plate 76 and produces a mixture of fuel and air in the proper proportions to produce an explosion. The parts are so proportioned that this mixture is somewhat rich, thus facilitating starting. As the speed of the engine increases the suction pan 73 is drawn still farther downward and a separation takes place between the lip 75 and the seat plate 76, thus by-passing a certain amount of air and reducing the richness of the mixture which is desirable when running. In any case the mixture of air and fuel passes into the vaporizing chamber 13.

While the operation of the parts just described produces a mixture of air and fuel, my invention is designed to operate on liquid fuels which are not readily vaporized, such as kerosene and the like, and this mixture while in the right proportions for use in an internal combustion engine is far from being in the proper condition to produce explosions therein due to the fact that the fuel is present in the form of large drops and not as a true vapor. This mixture of liquid and air comes in contact with the walls of the vaporizing chamber, namely, the shell 31 and the dome top 35. The shell 31 is heated by the exhaust vapors of the engine which enter through the exhaust intake 43 passing upwardly between the shells 28 and 31 and downwardly between the shells 25 and 28 at the same time heating the incoming air between the shells 21 and 25. The drops of liquid fuel which come in contact with the wall 31 are sufficiently heated to produce a true vapor. The liquid which falls on the dome top 35 tends to run downwardly thereover and to pass into the narrow annular space between the shells 31 and 33. In passing downwardly over these walls the greater proportion of it is changed to a vapor which is thoroughly mixed with the air, which is also passing downwardly through this space. The mixture finally passes through the openings formed by the serrations 34, the vapor with possibly some unvaporized fuel entering the vapor separating chamber 14.

It will be noted that the vapor separating chamber 14 is of large area as compared to the outlet pipe 36 and that it is almost entirely surrounded by hot walls so that condensation is largely prevented therein. The object of the vapor separating chamber is to allow any drops of unvaporized fuel to settle, all the unvaporized fuel finally falling on the domed bottom 32 which is also heated by the exhaust gases. Considerable evaporation takes place therefrom, any unvaporized liquid passing through the opening 40 into the pipe 39. A jet of air is admitted to this pipe through the pipe 41 and the unvaporized fuel falling therein is blown upwardly through the pipe 39 into the vaporizing chamber 13 where it mixes with the entering mixture, passing downwardly between the shells 31 and 33 for retreatment. If any accumulation occurs in the pipe 39, which may occur at times, this accumulation is readily relieved through the pet cock 44. The degree of vacuum inside my invention is controlled by the valve 38 either automatically or manually as the operator finds it desirable. The final mixture is drawn through the pipe 36 into the engine.

It will be seen that my invention comprises means for producing a mixture of liquid fuel and air together with means for heating this mixture to thoroughly vaporize the liquid fuel, and an enlarged chamber which is protected from heat losses in which the separation of unvaporized fuel takes place, together with means for recirculating the separated liquid fuel for retreatment with the original mixture.

What I claim is:—

1. A fuel producer comprising a shell; a vaporizing device located in said shell; walls forming a narrow passage so located in said shell as to form a channel through which the vapors from said vaporizing device may pass; walls forming with said first named walls a heating chamber adjacent to said passage, said heating chamber being so constructed as to allow hot gases to be passed therethrough; a vapor separating chamber in direct connection with said narrow passage, said vapor separating chamber being of large volume as compared to said narrow passage, and outlet means for withdrawing vapors from the top of said vapor separating chamber.

2. A fuel producer as in claim 1 also comprising means for passing any liquid which may settle in said separating chamber back into a place from which it joins the liquid entering said heating chamber.

3. A fuel producer as in claim 1 in which the vapor separating chamber is inside the heating chamber.

4. A fuel producer as in claim 1 in which the outlet means is arranged for direct connection to the intake of an internal combustion engine and in which the vaporizing device comprises means, responsive to the suction of said engine, for varying the amount of fuel admitted to suit the needs of the engine.

In testimony whereof, I have hereunto set my hand at Los Angeles, California, this 16th day of July, 1918.

MILON J. TRUMBLE.